(12) United States Patent
Canepa et al.

(10) Patent No.: US 11,427,054 B2
(45) Date of Patent: Aug. 30, 2022

(54) VEHICLE SUNSHADE ASSEMBLY

(71) Applicant: Honda Motor Co., Ltd., Tokyo (JP)

(72) Inventors: Rachel E. Canepa, Marysville, OH (US); Andrew E. Barrow, Hilliard, OH (US); Sarah Jennifer Huth, Dublin, OH (US); Ryan W. Van Voorhis, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 412 days.

(21) Appl. No.: 16/744,721

(22) Filed: Jan. 16, 2020

(65) Prior Publication Data

US 2021/0221201 A1    Jul. 22, 2021

(51) Int. Cl.
| | |
|---|---|
| *B60J 3/02* | (2006.01) |
| *B60J 5/04* | (2006.01) |
| *B60J 10/70* | (2016.01) |
| *B60J 1/20* | (2006.01) |

(52) U.S. Cl.
CPC .......... *B60J 3/0221* (2013.01); *B60J 1/2063* (2013.01); *B60J 5/0468* (2013.01); *B60J 10/70* (2016.02)

(58) Field of Classification Search
CPC ........ B60J 1/2063; B60J 3/0221; B60J 10/70; B60J 5/0468
See application file for complete search history.

(56) References Cited

U.S. PATENT DOCUMENTS

| | | | |
|---|---|---|---|
| 7,475,935 B2 * | 1/2009 | Ercolano | B60J 1/2038 |
| | | | 296/146.7 |
| 8,646,828 B2 | 2/2014 | Haase et al. | |
| 8,663,535 B2 | 3/2014 | Larcom et al. | |
| 8,801,070 B2 | 8/2014 | Takeuchi et al. | |
| 9,132,717 B2 * | 9/2015 | Usami | B60J 1/2063 |
| 9,452,663 B2 * | 9/2016 | Watanabe | E06B 9/40 |
| 10,272,756 B2 | 4/2019 | Sia, Jr. et al. | |

FOREIGN PATENT DOCUMENTS

| | | |
|---|---|---|
| JP | 3566549 | 9/2004 |
| JP | 4525359 | 8/2010 |
| JP | 6340624 | 6/2018 |

\* cited by examiner

*Primary Examiner* — Joseph D. Pape
(74) *Attorney, Agent, or Firm* — Rankin, Hill & Clark LLP

(57) ABSTRACT

A sunshade assembly for a vehicle door includes a housing including a storage portion configured to support a retractor for a sunshade, and a guide portion configured to guide the sunshade into and out of the storage portion. The guide portion includes a first wall and a second wall extended from the storage portion. The first wall and the second wall together define an elongated first opening for extension of the sunshade from the retractor. A sunshade garnish includes a base wall having an elongated second opening aligned with the first opening. A mounting flange depending from the base wall flanks the first wall and is directly connected to an outer surface of the storage portion. A weather-strip support covered by the sunshade garnish includes a mounting tab flanking the second wall and directly connected to the outer surface of the storage portion.

20 Claims, 7 Drawing Sheets

US 11,427,054 B2

VEHICLE SUNSHADE ASSEMBLY

BACKGROUND

The present disclosure relates to a sunshade assembly for a vehicle door and, more particularly to a retractable sunshade assembly for shading a windowpane of a vehicle door. For purposes of this application, a sunshade is a screen (often retractable) that is typically used to shade a rear windowpane associated with a rear seat while a sun visor is mounted in front of the driver and/or front seat passenger. A basic sunshade assembly may generally include a sunshade mounted on a retractor having a retractable roller, and at least one hook or other attachment mechanism for securing the sunshade in a deployed position for shading the windowpane. The roller is often recessed within an upper portion of the vehicle door or adjacent side panel of the vehicle, and concealed from view by a trim panel. The trim panel often has an elongated opening or slit through which the sunshade extends when being deployed or detracted from the roller.

BRIEF DESCRIPTION

According to one aspect, a sunshade assembly for a vehicle door comprises a housing including a storage portion configured to support a retractor for a sunshade, and a guide portion configured to guide the sunshade into and out of the storage portion. The guide portion includes a first wall and a second wall extended from the storage portion. The first wall and the second wall together define an elongated first opening for extension of the sunshade from the retractor. A sunshade garnish includes a base wall having an elongated second opening aligned with the first opening. A mounting flange depending from the base wall flanks the first wall and is directly connected to an outer surface of the storage portion. A weather-strip support covered by the sunshade garnish includes a mounting tab flanking the second wall and directly connected to the outer surface of the storage portion.

According to another aspect, a sunshade assembly for a vehicle door comprises a housing including a storage portion configured to support a retractor for a sunshade, and a guide portion configured to guide the sunshade into and out of the storage portion. The guide portion defines an elongated first opening for extension of the sunshade from the retractor. A sunshade garnish covers the housing and has an elongated second opening aligned with the first opening. A weather-strip support is covered by the sunshade garnish. An interior door trim panel has an edge portion covered by the sunshade garnish. Each of the sunshade garnish, the weather-strip support and the door trim panel is directly connected to the housing.

According to another aspect, a method of assembling a vehicle door comprises providing a sunshade assembly, the sunshade assembly including: a housing configured to house a retractor for a sunshade, an interior sunshade garnish, a weather-strip support, and an interior door trim panel; configuring each of the housing and the sunshade garnish such that the sunshade garnish is directly connected to the housing; configuring each of the housing and the weather-strip support such that the weather-strip support is directly connected to the housing; and configuring each of the housing and the door trim panel such that the door trim panel is directly connected to the housing.

DETAILED DESCRIPTION

Figure 1:
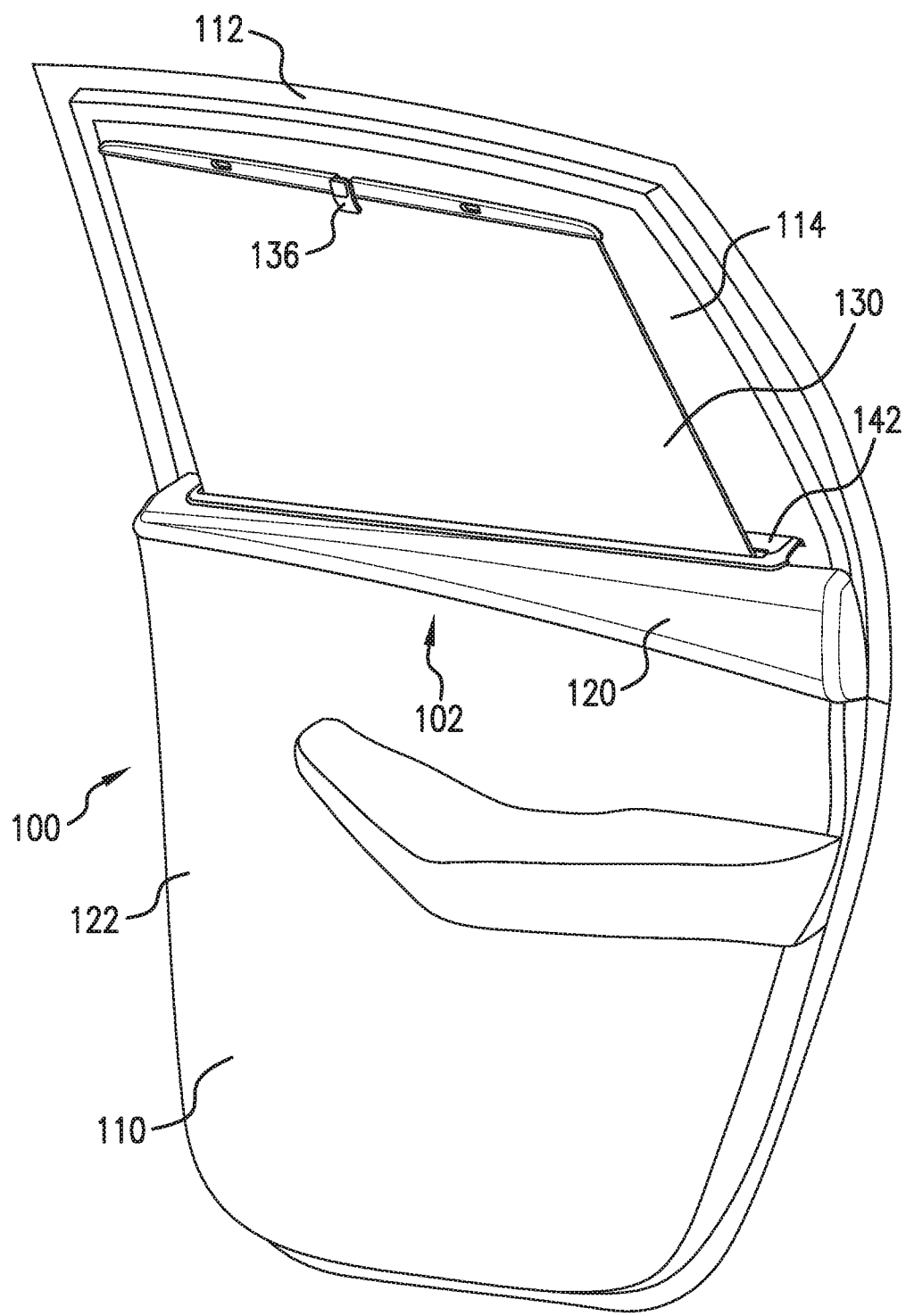
FIG. 1 is a partial perspective view of a vehicle door including an exemplary sunshade assembly according to the present disclosure.
Figure 2:
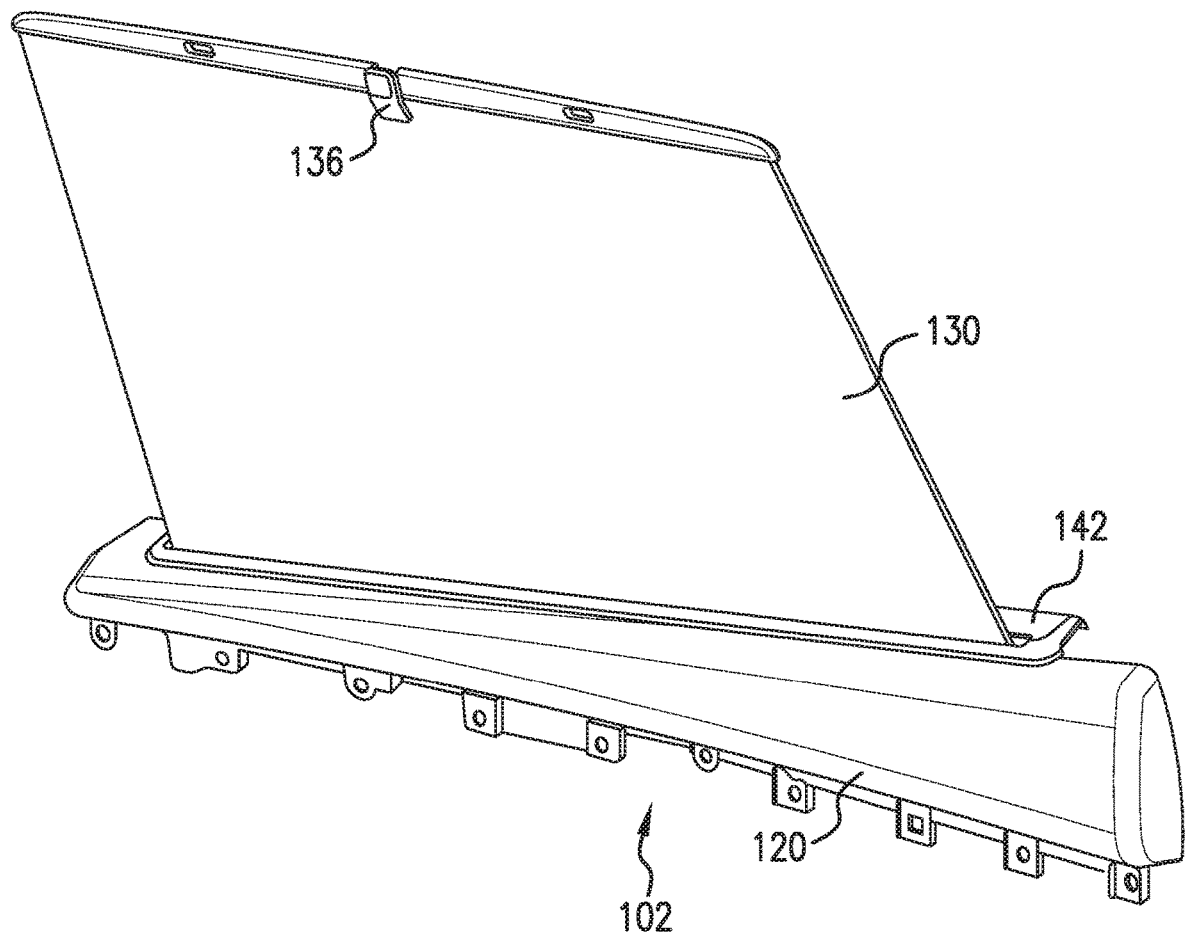
FIG. 2 is a perspective view of the sunshade assembly of FIG. 1.

It should, of course, be understood that the description and drawings herein are merely illustrative and that various modifications and changes can be made in the structures disclosed without departing from the present disclosure. For purposes of description herein, spatially relative terms relate to the invention as oriented in the figures. Referring now to the drawings, wherein like numerals refer to like parts throughout the several views, FIGS. 1 and 2 schematically illustrate a vehicle door 100 including an exemplary sunshade assembly 102 according to the present disclosure. The vehicle door 100 can include a body 110 (generally defined by a door frame having an outer door panel and an inner door panel), a door sash 112 extended along an upper portion of the body 110, and a windowpane. The windowpane is omitted from the figures for simplicity and clarity of the drawings. The door sash 112 can cooperate with an upper edge of the body 110 to provide a frame that surrounds an opening 114 in the vehicle door 100 for the windowpane. The door sash 112 can be configured to hold the windowpane in a fixed position, or to permit and guide the windowpane as it moves between a closed position and an opened position. The vehicle door 100 can include an inner weather-strip and an outer weather-strip, each extended along the upper edge of the body 110. The inner weather-strip, which can be connected to a weather-strip support 118 (FIG. 3), engages the interior surface of the windowpane, and the outer weather-strip engages the exterior surface of the windowpane. The inner and outer weather-strips are also omitted for simplicity and clarity of the drawings.

As is well known, a lower portion of the body 110 can include a hinge assembly, a latch assembly for securing the vehicle door 100 in a closed portion, inner and outer door handles for releasing the latch assembly and facilitating movement of the door assembly by a user of the vehicle, a door lock assembly, and a window regulator assembly for raising and lowering the windowpane. Exemplary embodiments are intended to include more or less of these components, systems and assemblies included with the vehicle door 100. Various interior door trim panels 120, 122 are provided on the body 110 for concealing components mounted within the door. The door trim panels 120, 122 can be connected to the inner door panel of the body 110 in any appropriate manner, such as but not limited to mechanical fasteners, adhesive bonding or a combination thereof. As depicted, the door trim panel 120 extends along the upper edge of the body 110 and can be considered a part of the sunshade assembly 102.

Turning now to FIGS. 2-7, details of the exemplary sunshade assembly 102 will be described. The sunshade assembly 102 generally includes a retractable sunshade 130 and a retractor 132. The sunshade 130 can move between an extended position (FIGS. 1 and 2) and a retracted position (FIGS. 2-7) and can extend across at least a substantial portion of the window opening 114 when the sunshade is in the extended position. The sunshade 130 can be coiled onto the retractor 132 when the sunshade is in the retracted position. The retractor 132 can be biased to coil the sunshade 130 onto a roller 134 of the retractor 132. A pull tab or handle 136 can be clamped onto the free end of the sunshade 130 to facilitate movement of the sunshade between the extended position and retracted position.

The sunshade assembly 102 can include a housing 140 and an interior sunshade garnish 142. The housing 140 includes a storage portion 146 configured to support the retractor 132, and a guide portion 148 configured to accommodate and guide the sunshade 130 into and out of the storage portion. The storage portion 146 and the guide portion 148 can each be hollow and in communication with each other so that the sunshade 130 can be retracted or extended from the retractor 132. The storage portion houses the roller 134 of the retractor 132, and can be sized to accommodate a retracted length of the sunshade 130. The guide portion 148 can include an inner opening 150 (FIG. 4) in communication with the storage portion 146. The guide portion 148 can include an outer opening 152 (FIG. 3) through which an extended length of the sunshade 130 can pass. In the depicted aspect, the guide portion 148 includes a first wall 160 and a second wall 162 spaced from the first wall 160, each wall extended from the storage portion 146. The first wall 160 and the second wall 162 together define the inner opening 150 and the outer opening 152.

Figure 3:
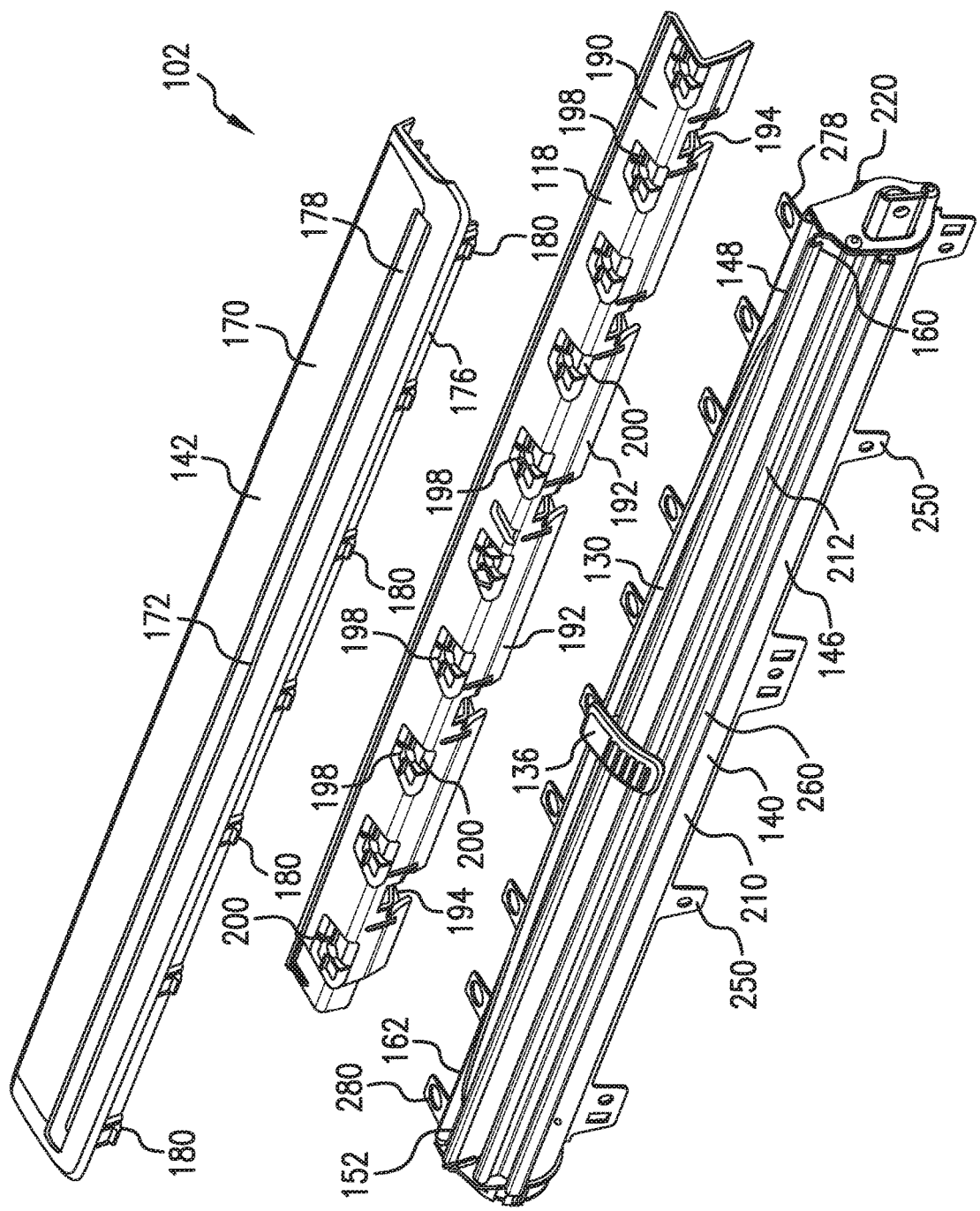
FIG. 3 is a partial exploded perspective view of the sunshade assembly of FIG. 2, with a sunshade in a retracted position.

According to the present embodiment, the sunshade assembly 102 includes the sunshade garnish 142 adapted to cover the weather-strip support 118 and the housing 140. The sunshade garnish 142 includes an upper base wall 170 which at least partially forms the upper edge of the vehicle door body 110. The base wall 170 has formed therethrough an elongated opening 172, which when the sunshade garnish is assembled to the housing 140 is aligned with the outer opening 152 of the guide portion 148. The sunshade 130 can extend through the opening 172 when the sunshade extends from the retractor 132. As shown, the opening 172 is defined by at least first and second inner walls or flanges 176, 178 depending from the base wall 170. As depicted in FIG. 3, arrayed along a length of the first flange 176 are spaced tabs 180 adapted for direct connection to the housing 140. Therefore, the first flange 176 of the sunshade garnish 142 is configured as a mounting flange and will be referred to herein as mounting flange 176. The second flange 178 can extend substantially perpendicular to the base wall 170. In assembly, the mounting flange 176 flanks or borders the first wall 160 of the guide portion 148 and is directly connected to the storage portion 146 of the housing 140. The second flange 178 contacts the guide portion 148 to provide a continuous contact or guide surface for extension and retraction of the sunshade 130 relative to the housing 140.

Figure 5:
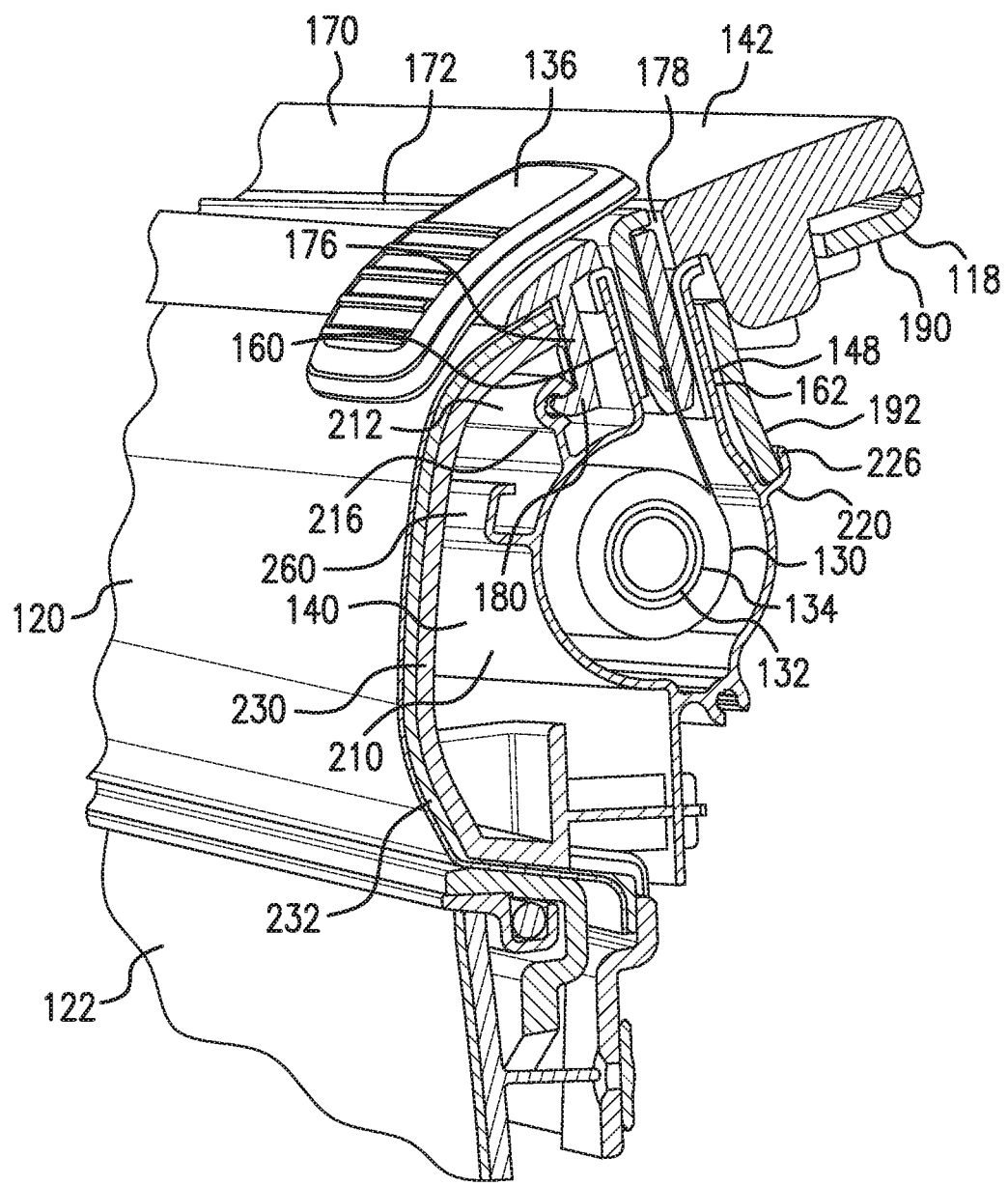
Figure 6:
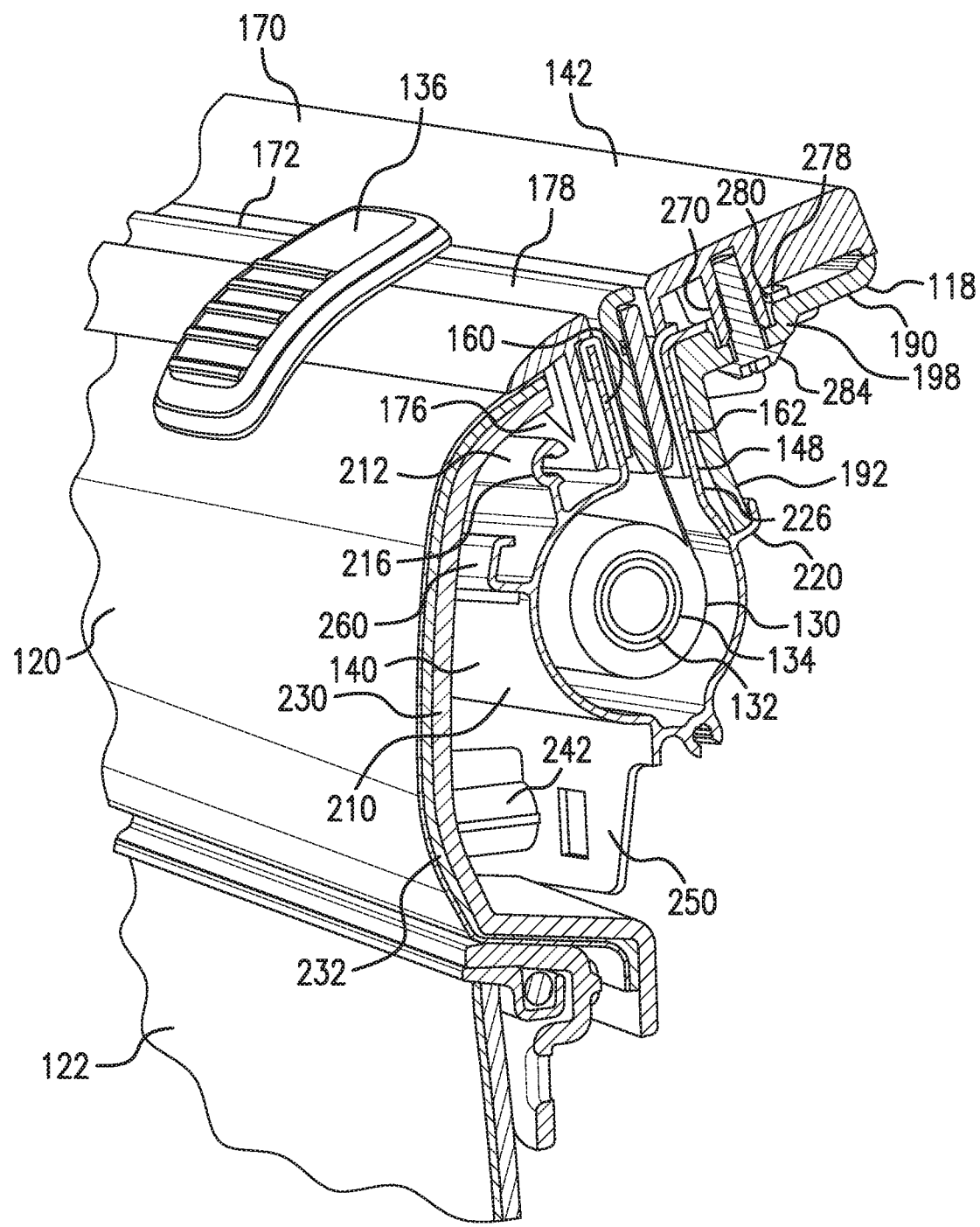

With reference to FIGS. 5 and 6, the weather-strip support 118 is directly supported by and connect to the housing 140 of the sunshade assembly 102. The direct connection between the weather-strip support 118 and the housing 140 can facilitate the assembly process of the sunshade assembly 102 and the inner weather-strip to the vehicle door body 110. In FIG. 3, the weather-strip support 118 includes an interior wall 190 and a mounting tab 192 depending for the interior wall. The mounting tab 192 can extend an entire length dimension of the weather-strip support 118, and is depicted as being interrupted by spaced connectors 194. The mounting tab 192 is adapted for direct connection to the housing 140, and in assembly, the mounting tab 192 flanks or borders the second wall 162 of the guide portion 148 and is directly connected to the storage portion 146. The connectors 194 are adapted for mounting of the inner weather-strip to the weather-strip support 118. Further, the interior wall 190 can be provided with spaced recessed collars 198 each having a hole 200 that extends through the interior wall 190. As will be discussed below, the holes 200 can permit the weather-strip support 118 to be further connected to the housing 140 and the sunshade garnish 142.

With reference back to FIGS. 4-7, each of the sunshade garnish 142, the weather-strip support 118 and the door trim panel 120 is directly connected to the housing 140, particularly an outer surface 210 of the storage portion 146. To allow for this direct connection, a first mounting feature 212 extends from the outer surface 210 along a length dimension of the storage portion 146, the first mounting feature adapted for connection to the mounting flange 176 of the sunshade garnish 142. In the depicted aspect, the first mounting feature 212 is a first flange including an end portion 216 shaped for connection to the mounting flange 176. By way of example, the end portion 216 can be channel-shaped (e.g., C-shaped) with the end portion 216 facing the first wall 160 allowing for a simple connection with the tabs 180 of the mounting flange 176 of the sunshade garnish 142. A second mounting feature 220 extends from the outer surface 210 along the length dimension of the storage portion 146, the second mounting feature 220 adapted for connection to the mounting tab 192 of the weather-strip support 118. In the depicted aspect, the second mounting feature 220 is a second flange. The second flange is coved upward toward the guide portion 148 and together with the second wall 162 of the guide portion 148 defines a channel 226 sized to securely receive the mounting tab 192 of the weather-strip support 118.

Figure 4:
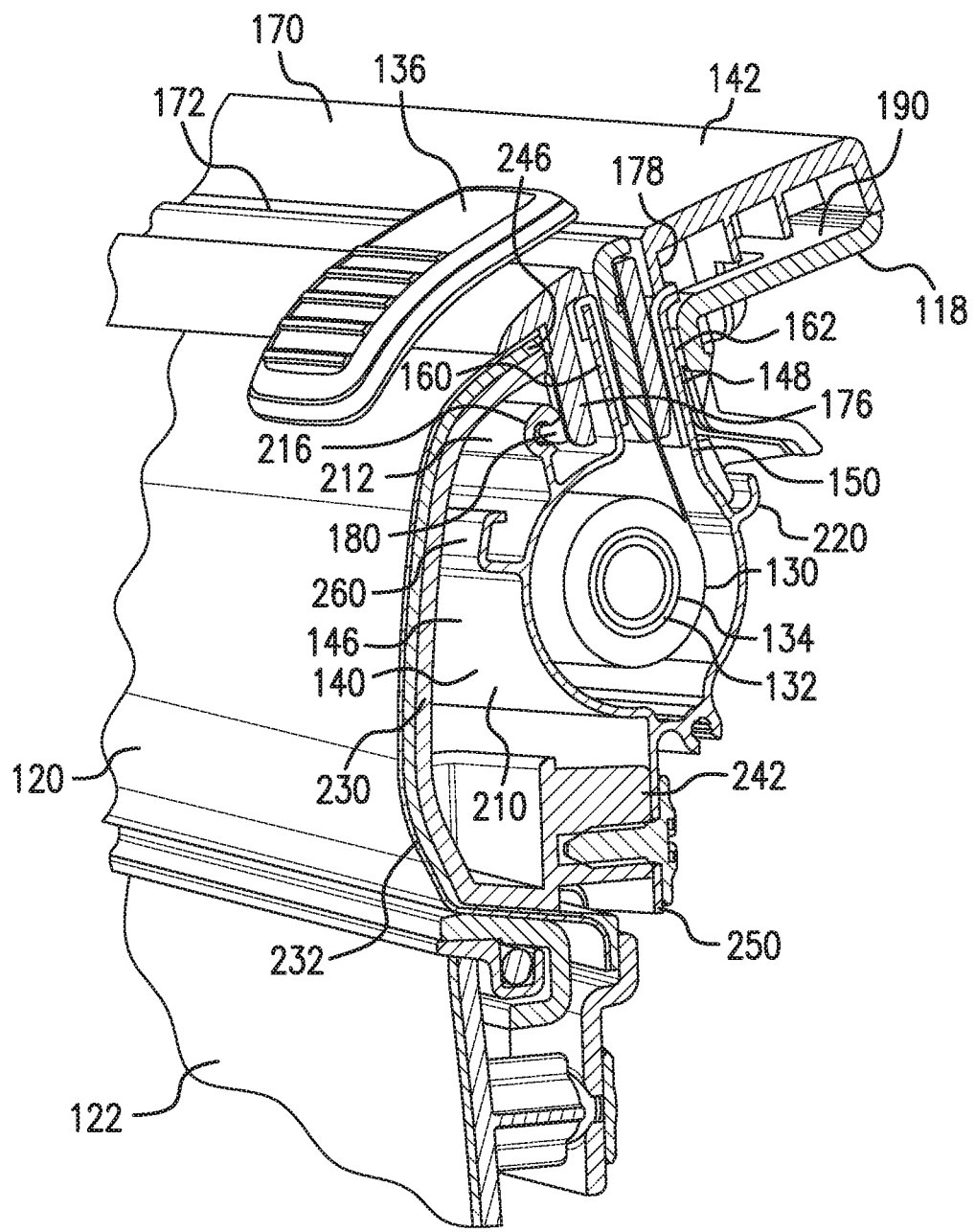
FIGS. 4, 5, 6, and 7 are partial cross-sectional perspective views of the vehicle door of FIG. 1, with the sunshade in the retracted position.
Figure 7:
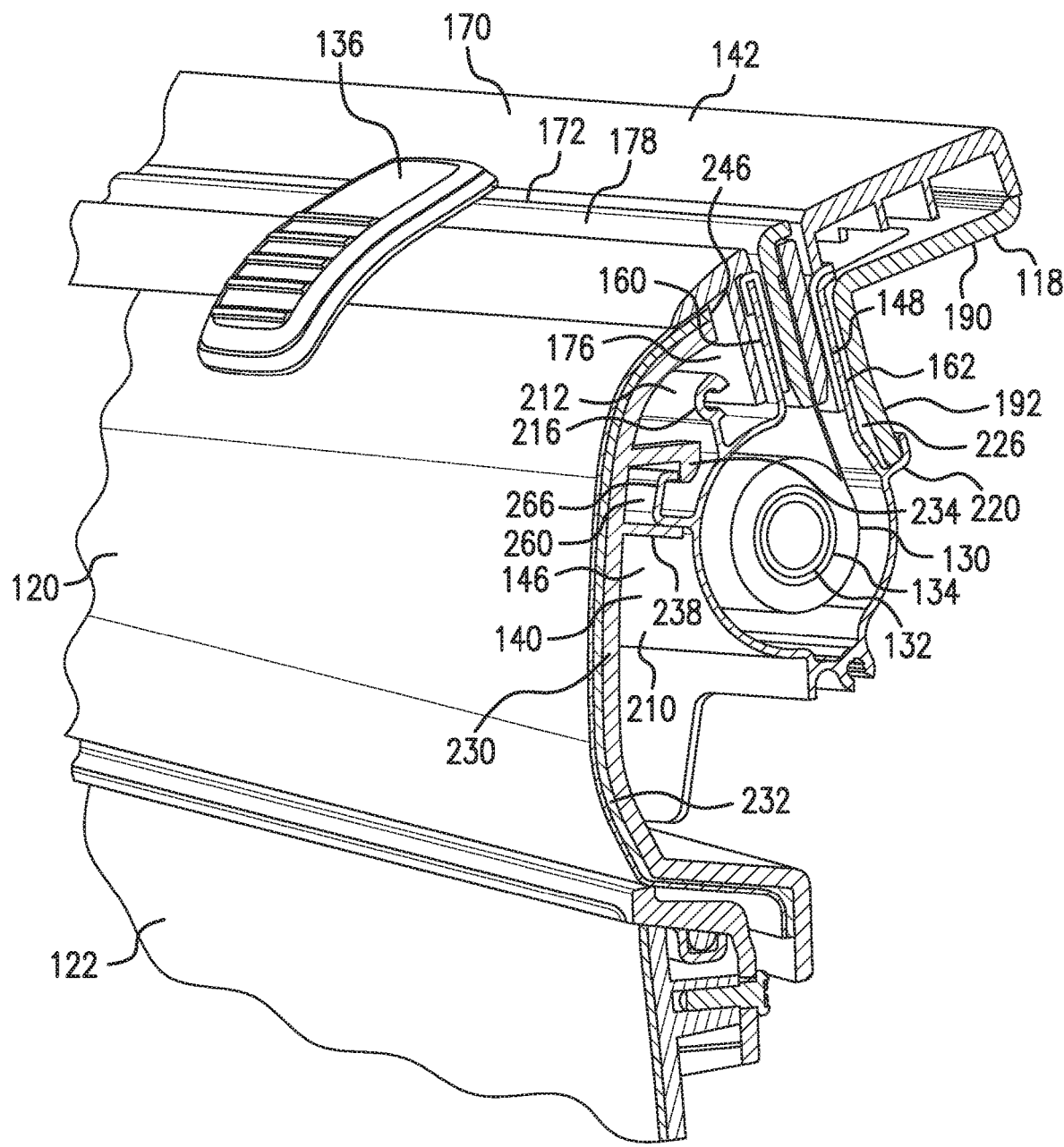

The features of the interior door trim panel 120 for connection to the sunshade assembly 102 will be described with reference to FIGS. 4 and 7. As shown, the door trim panel 120 can include a substrate 230 having an outer covering 232. A fastening tab 234 is projected from the substrate. The fastening tab 234 can extend an entirety of a length dimension of the door trim panel 120, or the door trim panel 120 can include multiple aligned fastening tabs. An alignment tab 238 can also project from the substrate 230. The alignment tab 238 is spaced downward from the fastening tab 234. Like the fastening tab 234, the alignment tab 238 can extend an entirety of the length dimension of the door trim panel 120, or multiple aligned alignment tabs can be provided, one for each fastening tab 234. At least one screw boss 242 can also project from a lower end portion the substrate 230. In assembly, the door trim panel 120 covers the housing 140, an upper edge portion 246 of the door trim panel 120 is adjacent to the mounting flange 176 of the sunshade garnish 142 and is covered by the sunshade garnish 142. The fastening tab 234 is directly connected to the housing 140, and the at least one screw boss 242 is fastened to at least one mounting tab 250 provided on the housing 140. To allow for this direct connection of the fastening tab 234 to the housing 140, a third mounting feature 260 extends from the outer surface 210 of the storage portion 146 along the length dimension of the storage portion, the third mounting feature adapted for connection to the fastening tab 234. In the depicted aspect, the third mounting feature 260 is a third flange including an end portion 266 shaped for connection to the fastening tab 234. By way of example, the end portion 266 can be channel-shaped (e.g., L-shaped) with the end portion 266 facing the outer surface 210 allowing for a simple connection with the fastening tab 234. As depicted in FIG. 7, the end portion 266 of the third flange is positioned between the alignment tab 238 and the fastening tab 234. This direct connection between the door trim panel 120 and the housing 140 further facilitates the assembly process of the vehicle door 100.

In addition to the direct connection of each of the weather-strip support 118, the door trim panel 120 and the sunshade garnish 142 to the housing 140, a fastener assembly can connect together each of the weather-strip support 118, the housing 140, and the sunshade garnish 142. As best depicted in FIG. 6, at least one mounting or connection boss 270 having a threaded opening depends from the base wall 170 of the sunshade garnish 142. At least one fastener tab 278 having an aperture 280 extends away from the second wall 162 of the guide portion 148. In assembly, the fastener tab 278 extends along the interior wall 190 of the weather-strip support 118 and is aligned with the connection boss 270 and the recessed collar 198 formed in the weather-strip support 118. At least a portion of the connection boss 270 can extend through the aperture 280 and is seated in the recessed collar 198. Thus, the connection boss 270 can restrict relative movement between the housing 140 and the sunshade garnish 142. A threaded fastener 284, such as but not limited to a screw or a bolt, can extend through the hole 200 of the collar 198 and be threaded onto the connection boss 270. Thus, the housing 140, the weather-strip support 118 and the sunshade garnish 142 can be securely fastened together.

As is evident from the foregoing, a method of assembling a vehicle door 100 is provided. The exemplary method generally comprises providing a sunshade assembly 102 for the vehicle door 100. As described above, the sunshade assembly includes a housing 140 configured to house a retractor 132 for a sunshade 130, an interior sunshade garnish 142, a weather-strip support 118, and an interior door trim panel 120. The method comprises configuring each of the housing 140 and the sunshade garnish 142 such that the sunshade garnish is directly connected to the housing; configuring each of the housing 140 and the weather-strip support 118 such that the weather-strip support 118 is directly connected to the housing 140; and configuring each of the housing 140 and the door trim panel 120 such that the door trim panel is directly connected to the housing.

The exemplary method further comprises configuring the housing 140 to include a first flange 212 adapted for connection to a mounting flange 176 of the sunshade garnish 142, configuring the housing to include a second flange 220 adapted for connection to a mounting tab 192 of the weather-strip support 118, and configuring the housing to include a third flange 260 adapted for connection to a fastening tab 234 of the door trim panel 120. The exemplary method further comprises directly fastening together the housing 140, the weather-strip support 118 and the sunshade garnish 142.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A sunshade assembly for a vehicle door comprising:
a housing including a storage portion configured to support a retractor for a sunshade, and a guide portion configured to guide the sunshade into and out of the storage portion, the guide portion includes a first wall and a second wall extended from the storage portion, the first wall and the second wall together define an elongated first opening for extension of the sunshade from the retractor;
a sunshade garnish including a base wall having an elongated second opening aligned with the first opening, a mounting flange depending from the base wall flanks the first wall and is directly connected to an outer surface of the storage portion; and
a weather-strip support covered by the sunshade garnish, the weather-strip support includes a mounting tab flanking the second wall and directly connected to the outer surface of the storage portion.

2. The sunshade assembly of claim 1, wherein a first mounting feature extends from the outer surface along a length dimension of the storage portion, the first mounting feature adapted for connection to the mounting flange of the sunshade garnish.

3. The sunshade assembly of claim 2, wherein the first mounting feature is a first flange including a channel-shaped end portion for connection to the mounting flange of the sunshade garnish.

4. The sunshade assembly of claim 2, wherein a second mounting feature extends from the outer surface along the length dimension of the storage portion, the second mounting feature adapted for connection to the mounting tab of the weather-strip support.

5. The sunshade assembly of claim 4, wherein the second mounting feature is a second flange, the second flange together with the second wall defines a channel sized to receive the mounting tab of the weather-strip support.

6. The sunshade assembly of claim 4, further including an interior door trim panel directly connected to the outer surface of the storage portion, an edge portion of the door trim covered by the sunshade garnish.

7. The sunshade assembly of claim 6, wherein the door trim panel includes a fastening tab, and a third mounting feature extends from the outer surface along the length dimension of the storage portion, the third mounting feature adapted for connection to the fastening tab.

8. The sunshade assembly of claim 7, wherein the third mounting feature is a third flange including a channel-shaped end portion for connection to the fastening tab.

9. The sunshade assembly of claim 7, wherein the door trim panel includes an alignment tab, the end portion of the third flange positioned between the alignment tab and the fastening tab.

10. The sunshade assembly of claim 1, wherein the weather-strip support is fastened to both the second wall of the guide portion and the base wall of the sunshade garnish.

11. The sunshade assembly of claim 10, wherein a mounting boss depends from the base wall of the sunshade garnish, the mounting boss extends through an opening formed in an extension of the second wall of the guide portion and is seated in a recessed portion formed in the weather-strip support.

12. A sunshade assembly for a vehicle door comprising:
a housing including a storage portion configured to support a retractor for a sunshade, and a guide portion configured to guide the sunshade into and out of the storage portion, the guide portion defines an elongated first opening for extension of the sunshade from the retractor;
a sunshade garnish covering the housing and having an elongated second opening aligned with the first opening;

a weather-strip support covered by the sunshade garnish; and an interior door trim panel having an edge portion covered by the sunshade garnish, wherein each of the sunshade garnish, the weather-strip support and the door trim panel is directly connected to the housing.

13. The sunshade assembly of claim 12, wherein the weather-strip support is fastened to both a mounting tab extended from the guide portion and a base wall of the sunshade garnish.

14. The sunshade assembly of claim 12, wherein the guide portion includes a first wall and a second wall extended from the storage portion, the first wall and the second wall together define the first opening, the sunshade garnish includes a mounting flange that borders the first wall for connection to the storage portion, and the weather-strip support includes a mounting tab that borders the second wall for connection to the storage portion.

15. The sunshade assembly of claim 14, wherein a first flange extends from the storage portion, the first flange includes a channel-shaped end portion for connection to the mounting flange of the sunshade garnish.

16. The sunshade assembly of claim 15, wherein a second flange extends from the storage portion, the second flange together with the second wall defines a channel sized to receive the mounting tab of the weather-strip support.

17. The sunshade assembly of claim 16, wherein the door trim panel includes a fastening tab, and a third flange extends from the storage portion adjacent the first flange, the third flange includes a channel-shaped end portion for connection to the fastening tab.

18. A method of assembling a vehicle door, the method comprising:

providing a sunshade assembly, the sunshade assembly including:

a housing configured to house a retractor for a sunshade, a sunshade garnish, a weather-strip support, and an interior door trim panel;

configuring each of the housing and the sunshade garnish such that the sunshade garnish is directly connected to the housing;

configuring each of the housing and the weather-strip support such that the weather-strip support is directly connected to the housing; and configuring each of the housing and the door trim panel such that the door trim panel is directly connected to the housing.

19. The method of claim 18, including:

configuring the housing to include a first flange adapted for connection to a mounting flange of the sunshade garnish, configuring the housing to include a second flange adapted for connection to a mounting tab of the weather-strip support, and configuring the housing to include a third flange adapted for connection to a fastening tab of the interior door trim panel.

20. The method of claim 18, including directly fastening together the housing, the weather-strip support and the sunshade garnish.

* * * * *